(12) United States Patent
McDermott

(10) Patent No.: US 9,260,055 B2
(45) Date of Patent: Feb. 16, 2016

(54) AUXILIARY LIGHTING FOR A MILITARY VEHICLE

(76) Inventor: Kevin McDermott, Rockledge, FL (US)

(*) Notice: Subject to any disclaimer, the term of this patent is extended or adjusted under 35 U.S.C. 154(b) by 0 days.

(21) Appl. No.: 13/309,348

(22) Filed: Dec. 1, 2011

(65) Prior Publication Data

US 2013/0141926 A1    Jun. 6, 2013

(51) Int. Cl.
*B60Q 1/26* (2006.01)
*B60Q 1/30* (2006.01)
*B60Q 1/32* (2006.01)

(52) U.S. Cl.
CPC ............ *B60Q 1/2615* (2013.01); *B60Q 1/30* (2013.01); *B60Q 1/32* (2013.01)

(58) Field of Classification Search
CPC .......... B60Q 1/2607; B60Q 1/52; B60Q 1/34; B60Q 1/18; B60Q 7/00; B60Q 1/44; B60Q 1/2615; B60Q 1/32; B60Q 1/26; B60Q 1/0483; B60Q 1/2696
USPC ......................................... 362/540–545, 549
See application file for complete search history.

(56) References Cited

U.S. PATENT DOCUMENTS

| | | | | |
|---|---|---|---|---|
| 5,490,049 A * | 2/1996 | Montalan et al. | ............ | 362/240 |
| 5,567,036 A * | 10/1996 | Theobald et al. | ............ | 362/485 |
| 6,095,663 A * | 8/2000 | Pond et al. | ............ | 362/247 |
| 6,520,445 B2 * | 2/2003 | Araujo | ............ | 242/434.5 |
| 6,520,669 B1 * | 2/2003 | Chen et al. | ............ | 362/545 |
| 6,533,445 B1 * | 3/2003 | Rogers | ............ | 362/540 |
| 7,540,640 B2 * | 6/2009 | Lin | ............ | 362/485 |
| 2002/0012251 A1 * | 1/2002 | Lee | ............ | 362/540 |
| 2003/0218882 A1 * | 11/2003 | Wirth et al. | ............ | 362/329 |
| 2008/0019141 A1 * | 1/2008 | Helms et al. | ............ | 362/544 |
| 2010/0103688 A1 * | 4/2010 | Riesebosch | ............ | 362/478 |

* cited by examiner

*Primary Examiner* — Julie Bannan
(74) *Attorney, Agent, or Firm* — Hauptman Ham, LLP

(57) ABSTRACT

Auxiliary lighting is added to military vehicles in response to civilian national emergencies permitting the vehicles to function as emergency vehicles. The auxiliary lights are attached to the military vehicles by employing military standard optical devices such as reflectors already mounted on the vehicles. This method of attaching the auxiliary lights avoids unacceptable modification of the military vehicles and reduces the complexity and time required to install the auxiliary lights. The attachment method also facilitates removal of the auxiliary lighting. Therefore temporary auxiliary lighting can be added to and removed from the military vehicle with a minimal use of tools or time. The auxiliary lighting is positioned on the military vehicle such that the emitted light beams are directed as required for the function the light is expected to perform. The auxiliary lights can be floodlights, warning lights, clearance or marker lights.

21 Claims, 5 Drawing Sheets

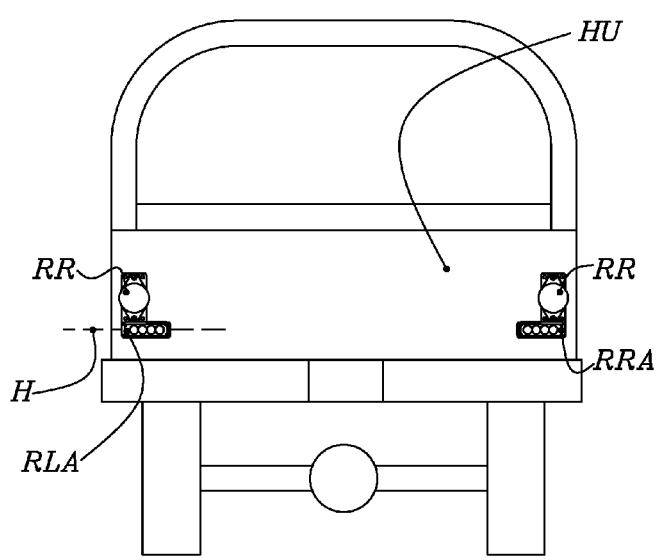
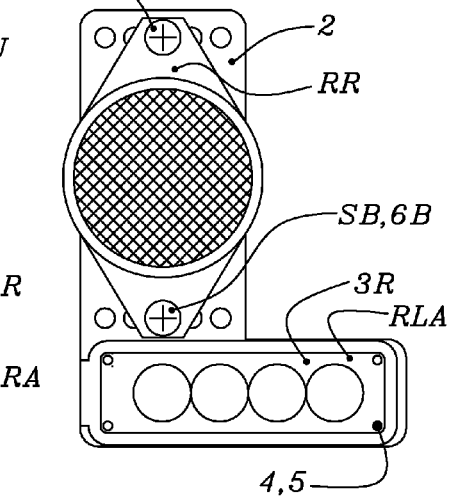
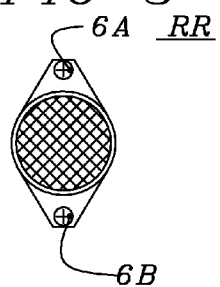
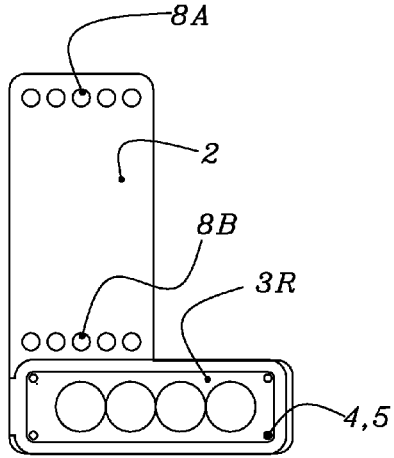
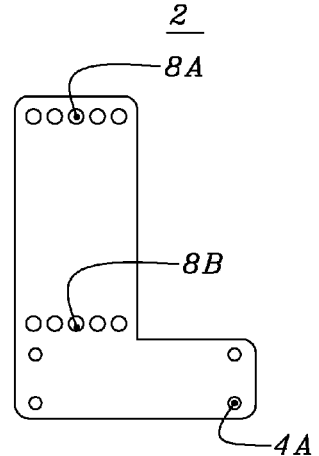

SFA

3S

AUXILIARY LIGHTING FOR A MILITARY VEHICLE

BACKGROUND OF THE INVENTION

1. Field of Invention

Vehicles are manufactured with lighting packages designed to meet the requirements of the specifications which govern the vehicle. The governing specification typically depends upon the function of that vehicle. For example, a typical commercial truck has requirements regarding stoplights, reflectors, turn signals, etc. A tow truck has many of those same requirements, plus it is required to have emergency warning lights. A military vehicle such as a Humvee is required to have a lighting package including clearance lights, turn signals, reflectors and blackout lights. There are instances were a vehicle includes a lighting package supplied by the manufacturer as part of the vehicle configured according to a planned function for that vehicle and the lighting package becomes inadequate because the vehicle is required to perform a new and different function. In these cases auxiliary lighting must be added to retrofit the vehicle to comply with the new function.

The National Guard is frequently called upon to help during national disasters. The vehicles they have at their disposal are military vehicles typified by the Humvee which are equipped with a basic military lighting package. The lighting package on these vehicles is inadequate for the emergency vehicle tasks that they are required to perform during national emergencies. It would therefore be very desirable to upgrade the lighting on these vehicles with auxiliary lights during a national emergency. The National Guard has been looking for a solution for this problem.

In addition to the needs of the National Guard, military convoys of regular Army units require auxiliary warning lights to prevent accidents on civilian streets. Easily installed temporary auxiliary emergency lights for military vehicles would be beneficial for protection of Army convoys as well.

On many occasions the requirement for auxiliary lighting is only temporary. Therefore it is desirable that the auxiliary lights be quickly installed on the vehicle with common tools. In addition, it is often required that the auxiliary lights be removed from the vehicle with little effort and in such a way that the vehicle is returned to its original form and function. Returning the vehicle to its normal function is important because vehicles such as the Humvee are assigned to National Guard units so that if they are deployed overseas they will have military specification vehicles with military lighting for their mission. It is therefore normally not acceptable to leave civilian national disaster type lighting on the military vehicles or to modify the vehicles such that they may become unacceptable for combat operations As part of its effort to support civilian authorities the National Guard uses Humvees and other military vehicles as emergency vehicles. Unfortunately for that function the vehicle lighting supplied by the manufacturer complying with the military specifications covering the Humvee is inadequate. In order to prevent the Humvees from being involved in an accident while performing civilian duties auxiliary lights should be added to the vehicle.

There are problems which inhibit the upgrading or retrofitting military vehicles so that they can perform as civilian emergency vehicles. The military imposes substantial limitations regarding modification of its vehicles including the Humvee. Vehicles cannot be modified such that the modification will reduce its ability to function at a later time in a military environment. In addition during natural disasters there is minimal time and manpower available for adding auxiliary lighting to the military vehicles.

The required auxiliary lighting can include flood, warning clearance or identification lights. The lights must be mounted on the vehicle such that they are positioned to direct their light beams as required to achieve the task that the lights are required to perform. Attaching the lights to the vehicle must be accomplished quickly, with a minimum of tools and usually without vehicle modification. Additionally it is often required that the auxiliary lights be removed quickly, with a minimum of tools and without modification of the vehicle.

Also the auxiliary lights must be positioned on the vehicle at locations which permit their emerging light to be projected in the required direction without obstruction.

Also the auxiliary lights should be positioned at locations on the vehicle not subject to damage as the vehicle is used. In this regard placing the lights at locations where opening a tailgate or door can damage them should be avoided.

Finally, it is desirable for the auxiliary lights be mounted near the corners of the vehicle to properly identify the perimeter of the vehicle to further reduce the possibility of accidents.

2. Prior Art

The National Guard community has been looking for a way to add auxiliary lighting to their vehicles because without auxiliary lights during civilian emergencies, their vehicles are vulnerable to accidents.

Volunteer fireman purchase their vehicles for their personal needs. However, during an emergency these personal vehicles can be required to function as emergency vehicles. In that capacity these personal vehicles must be protected by upgrading their vehicular lighting with high-power emergency warning lights to avoid accidents. One common solution to this problem is a temporary light attached to the vehicle roof with a magnet on the base of the light. The fireman simply places the light on the metal roof of his vehicle when an emergency arises. Thus without modifying the vehicle, the vehicle is equipped with high-power emergency lighting. A second prior art solution is a light attached to the interior window of the vehicle with suction cups. The suction cup design can be mounted on the front side or rear windows of a vehicle. It is frequently left in position during normal vehicle use but only illuminated during emergencies. It also is an acceptable commercial solution because it does not require modification of the vehicle.

The previously described prior art commercial solutions are not acceptable when trying to attach auxiliary lighting to most military vehicles. The Humvee vehicle employed by the military is an example of a vehicle that is very difficult to retrofit because its design deters using the civilian solutions as workable lighting upgrades. The body of the Humvee, for the most part, is non-magnetic and therefore a supplementary or auxiliary light cannot be attached using magnets. Also, many Humvees do not typically include side or rear glass windows, thereby preventing the use of glass window mounted suction cup lights to identify those portions of the vehicle. In addition, there are regulations which inhibit the National Guard from modifying military vehicles. Drilling holes in the vehicle to accept the auxiliary lighting would be problematic.

OBJECTS AND ADVANTAGES

The present invention seeks to secure auxiliary lights onto vehicles which require auxiliary lighting to be added after the vehicle has been manufactured. The present invention will find application for many types of military vehicles, however it will be most often employed for the Humvee.

The present invention employs optical devices such as reflectors, clearance lights, turn signals and headlights which are in compliance with military specifications and which already exist on the vehicles to attach the auxiliary lights.

The present invention provides a solution in which the auxiliary lighting solution that fits one military vehicle can fit other military vehicles as well, thereby saving expenses which would exist if each vehicle required a new configuration Although there exists a wide variety of military vehicles, many of the optical devices required on these vehicles are constructed according to military standards which have not substantially changed for many years. This consistency of optical devices on many military vehicles permits the present solution to the auxiliary lighting problem to be successful throughout a variety of military vehicles even though the vehicles were constructed over a wide time span. Lights mounted on the vehicles by the manufacturer are typically disposed to direct their light about the horizontal.

Since auxiliary lighting is also typically required to have their emitted light directed about the horizontal, employing existing optical devices to attach the auxiliary lighting facilitates the retrofitting procedure. Also, the lights required on vehicles typically have sophisticated optical systems to direct the emerging light towards a required direction. In order that the optical system be properly positioned such that the emerging light is directed as required, it is essential that the housing of the light be properly positioned on the vehicle. This positioning objective is achieved by fastening the light on or about a surface of the vehicle with a bracket which has a contour complimentary to the contour of the vehicle such that the contours interact with the optics of the light to direct the light beam as required. The present invention facilitates this objective because it employees optical devices on the vehicle which already have requirements regarding their location and orientation on the military vehicle.

The present invention in employing optical devices already mounted on the vehicle avoids the necessity of drilling holes in the vehicle.

The present invention also usually avoids the necessity of additional fasteners as many installations of the auxiliary lights of the present invention employ the exact fasteners used to attach the optical devices already mounted on the vehicle. In addition, by using the existing locations provided for existing optical devices the present invention facilitates the installation of the auxiliary lighting by eliminating the time which would have been required to select a location for the auxiliary lighting.

The present invention also reduces the possibility of poorly located auxiliary lighting emitting misdirected light beams by locating the auxiliary lights, relative to optical devices, holes and fasteners already on the military vehicles.

When being deployed as emergency vehicles the Humvees are likely to be positioned at a variety of angles on or near the roadway. Therefore in order for the Humvees to be properly protected from accidents the auxiliary warning lights must be installed such that they are visible from wide angles of approach by oncoming drivers. The present invention achieves this objective by placing the auxiliary lights at angles of divergence which permits their elongated light beams to overlap. This objective is achieved by disposing lights on the Humvee, such that the angle of divergence between any two lights is less than the horizontal elongated beamwidth of the lights.

The present invention requires a minimal quantity of bracket/light assemblies to retrofit a variety of military vehicles with the auxiliary lighting. This objective is achieved even though there exists a large variety of military vehicles. The present invention employs optical devices which are common to the large variety of military vehicles which exist. Therefore, the brackets and lights employed on a first military vehicle can often be similarly employed on other military vehicles of different shapes and sizes because these other military vehicles have the common optical devices installed.

DRAWINGS

Figs

FIG. 1 is a rear view of a military Humvee type vehicle with the auxiliary vehicle light installed.

FIG. 2 is a front view of the rear left light removed from FIG. 1.

FIG. 3 is a view of the reflector removed from FIG. 2.

FIG. 4 is a view of the rear left auxiliary vehicle light and reflector removed from FIG. 2.

FIG. 5 is a view of the rear left bracket removed from FIG. 4.

Figure 6:
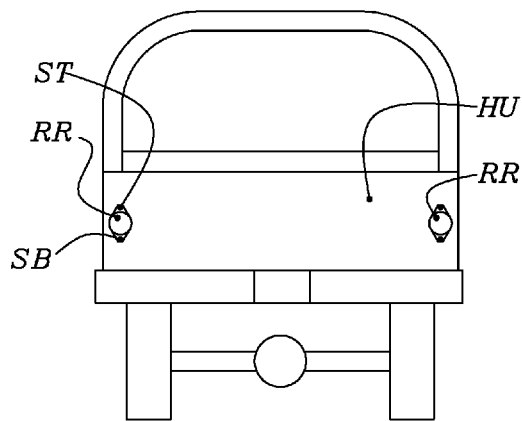
FIG. 6 is a view of the vehicle of FIG. 1 with the auxiliary vehicle light removed.

| DRAWINGS - Reference Letters | | DRAWINGS - Reference Numerals | | | |
|---|---|---|---|---|---|
| A | Lens Axis | 1 | | 2 | rear left bracket |
| CB | Concentrated Light Beam | 3F | light front | 3R | light rear |
| CLA | Clearance Light Assembly | 3S | light side | 4 | light screw hole |
| CO | Combined Light Beam | 4A | rear bracket light hole | 5 | light screw |
| EB | Elongated Light Beam | | | | |
| H | Horizontal | 6A | top reflector hole | 6B | bottom reflector hole |
| L1 | Lens One | 8A | rear bracket top hole | 8B | rear bracket bottom hole |
| L2 | Lens Two | | | | |
| L3 | Lens Three | 8C | side front bracket | 8D | side front bracket |

| DRAWINGS - Reference Letters | | | DRAWINGS - Reference Numerals | |
|---|---|---|---|---|
| L4 | Lens Four | | top hole | bottom hole |
| LS | Lens Surface | 9 | side front bracket 10 | clearance auxiliary light |
| RLA | Rear Left Light Assembly | 11 | clearance light 12 | clearance light screw |
| RR | Rear Reflector | | bracket | |
| RRA | Rear Right Light Assembly | 13 | step | |
| RS | Side Reflector | | | |
| SB | Screw Bottom | | | |
| SBS | Screw Bottom Side | | | |
| SFA | Side Front Light Assembly | | | |
| SRA | Side Rear Light Assembly | | | |
| ST | Screw Top | | | |
| STS | Screw Top Side | | | |
| V | Vertical | | | |
| WH1 | Elongated Horizontal Beamwidth | | | |
| WH2 | Concentrated Horizontal Beamwidth | | | |
| WV1 | Elongated Vertical Beamwidth | | | |
| WV2 | Concentrated Vertical Beamwidth | | | |

OPERATIONAL DESCRIPTION OF THE PREFERRED EMBODIMENT

A preferred embodiment of the auxiliary vehicle light of the present invention is illustrated in FIGS. 1 through 15. FIG. 1 is a rear view of a military vehicle HU such as a Humvee with the auxiliary vehicle lighting installed. Although the preferred embodiment is demonstrated on the Humvee vehicle HU the concepts disclosed are equally applicable to many other military vehicles which require auxiliary retrofit lighting. In addition to the Humvee and other military vehicles, military trailers and the 2½ and 5 ton trucks would also benefit from the present invention. In FIG. 1 rear left light, assembly RLA is attached to the left side of vehicle HU and rear right light, assembly RRA is attached to the right side of the vehicle HU. Vehicular lighting systems are normally attached to the corners of the vehicles they are marking to optimize the identification of the periphery of the vehicle. In the present disclosure the method of attaching an auxiliary vehicle light to a vehicle at one location will often apply to other locations on the vehicle. FIG. 2 is a front view of rear left light assembly RLA and rear reflector RR removed from FIG. 1. Looking at FIGS. 1 through 5 light rear 3R is attached to rear left bracket 2 by passing light screw 5 through light screw hole 4 in light rear 3R and threading it into rear bracket light hole 4A. Other similar screws and holes are used to secure light rear 3R to rear left bracket 2. Rear reflector RR in compliance with military standard MS 35387 is an optical component or device of the vehicle commonly supplied by the manufacturer of military vehicles. It includes top reflector hole 6A bottom reflector hole 6B and is attached to vehicle HU by the vehicle manufacturer with screw top ST and screw bottom SB. Rear left bracket 2 includes rear bracket top hole 8A and rear bracket bottom hole 8B dimensioned such that rear reflector RR can be removed from vehicle HU and reassembled to vehicle HU securely sandwiching rear left bracket 2 between rear reflector RR and vehicle HU thereby using screw top ST and screw bottom SB to fasten rear left bracket 2 to vehicle HU. Screw top ST and screw bottom SB are fasteners supplied with vehicle HU which are, in the present invention, dedicated to attaching rear left light assembly RLA to vehicle HU. Our other optical components and fasteners of vehicle HU can be employed to attach additional auxiliary lighting to vehicle HU. Rear left bracket 2 includes a plurality of holes adjacent to rear bracket top hole 8A and a plurality of holes adjacent to rear bracket bottom hole 8B permitting the installer to adjust the mounting position of rear left light assembly RLA to comply with variations in the vehicle. FIG. 4 represents a typical auxiliary vehicle light assembly which is the subject of the present application. An acceptable auxiliary vehicle light assembly can have a variety of configurations in order to adapt to the variety of available vehicles. A typical vehicle can employ assemblies similar or identical to that shown in FIG. 4 at several locations on the vehicle in order to equip it with enough warning lights to permit it to function safely in a hazardous environment such as a snowstorm. There are situations in which some vehicles require only a single auxiliary vehicle light. In those situations the installation of a single auxiliary vehicle light assembly such as rear left light assembly RLA would be acceptable.

Since rear reflector RR is positioned on vehicle HU such that it reflects light substantially about the horizontal employing rear reflector RR to attach rear light 3R to vehicle HU will be beneficial in assuring that light emitted from rear light 3R is directed about the horizontal. This results from the fact that rear light 3R includes optics, which are designed to project a light beam centered about the horizontal when mounted as shown in FIG. 1 with its lens surface LS parallel to the vertical and its lens axis A parallel to horizontal H. In the present the embodiment of the current invention each of the lights to be later described include their lens axis, positioned exactly as lens axis A of rear light 3R is positioned. In general, lights including clearance lights, turn signals and warning lights placed on the vehicle are required to direct their emitted light about the horizontal. This is necessary so that these lights are seen by oncoming drivers. Since the auxiliary vehicle lighting which is the subject of the present disclosure often involves warning lights it is usually desirable for these lights, as a normal consequence of their being attached to the vehicle, to be positioned such that their emitted light beams are directed about the horizontal. The objective of having the light beams of the auxiliary warning lights directed about the horizontal is facilitated by employing locations, fasteners and housings of existing optical devices such as reflectors and clearance lights installed by the manufacturer to attach the auxiliary vehicle lights to the vehicle.

FIG. 6 is a rear view of vehicle HU as it would appear before the installation of rear left light assembly RLA of the present invention. It is also a view of vehicle HU as it would appear after the removal of the auxiliary vehicle lighting of the present invention. In FIG. 6 rear reflector RR is attached to the rear of vehicle HU by means of screw top ST and screw bottom SB both of which are supplied by the vehicle manufacturer as components of the vehicle. It is frequently required that the installation of an auxiliary vehicle light be accomplished without modifying the vehicle, without substantial tools and within a short period of time. Furthermore, it is also frequently required that the auxiliary vehicle lighting be removed permitting the vehicle to be returned to its original form and function. The preferred embodiment of the present invention as disclosed herein achieves those objectives.

In FIGS. 1-5 rear left light assembly RLA is sandwiched between rear reflector RR and vehicle HU in order to secure light rear 3R to vehicle HU and assure that its light beam, to be later described, is directed about the horizontal. There are other methods of securing light rear 3R to vehicle HU using rear reflector RR. A first alternate method includes disposing rear reflector RR between rear left bracket 2 and vehicle HU. This method would require rear left bracket 2 to have a large hole at its center to accept rear reflector RR and a larger width permitting the large hole at the center of the bracket. A second method secures rear left bracket 2 to rear reflector RR with I clamp. A third method would require removing rear reflector RR completely and using screw top ST and screw bottom SB to secure rear left bracket 2 directly to vehicle HU. This method would employ the vehicle mount holes already existing in vehicle HU and dedicated to secure rear reflector RR to vehicle HU.

Figure 7:
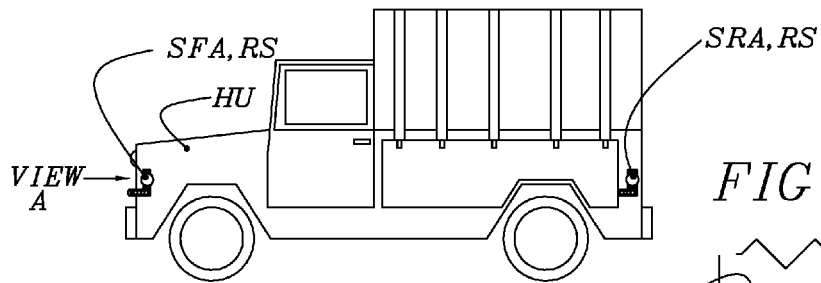
FIG. 7 is a view of the side of the vehicle of FIG. 1.

In FIG. 7 side front light assembly SFA is attached to the front of the side of the vehicle HU and side rear light assembly SRA is attached to the rear of the side of the vehicle HU.

Figure 8:
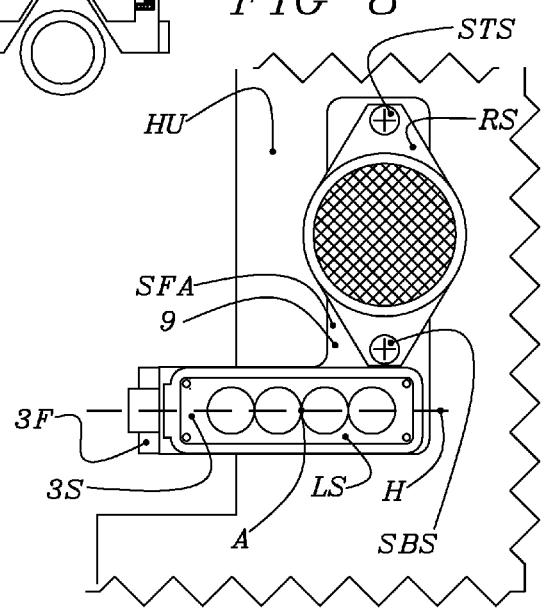
FIG. 8 is a view of the front side auxiliary vehicle light and reflector removed from FIG. 7.
Figure 9:
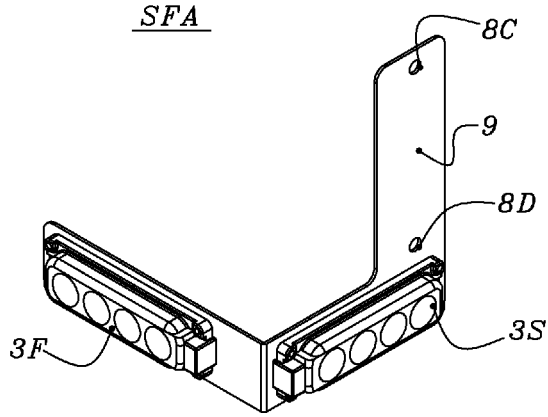
FIG. 9 is a perspective view of the side bracket removed from FIG. 8.
Figure 10:
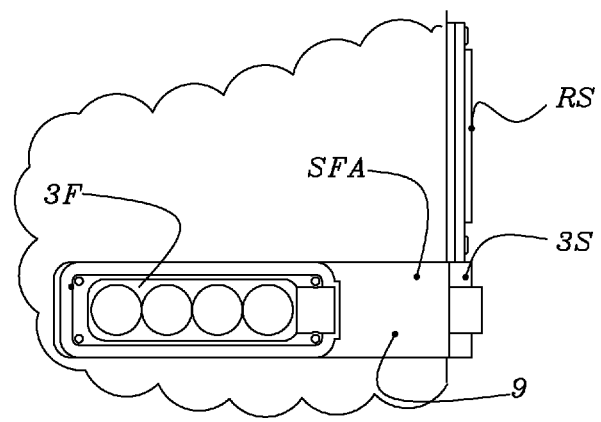
FIG. 10 is a partial view of the front of the vehicle of FIG. 1 showing the front side auxiliary vehicle light attached to the vehicle.
Figure 12:
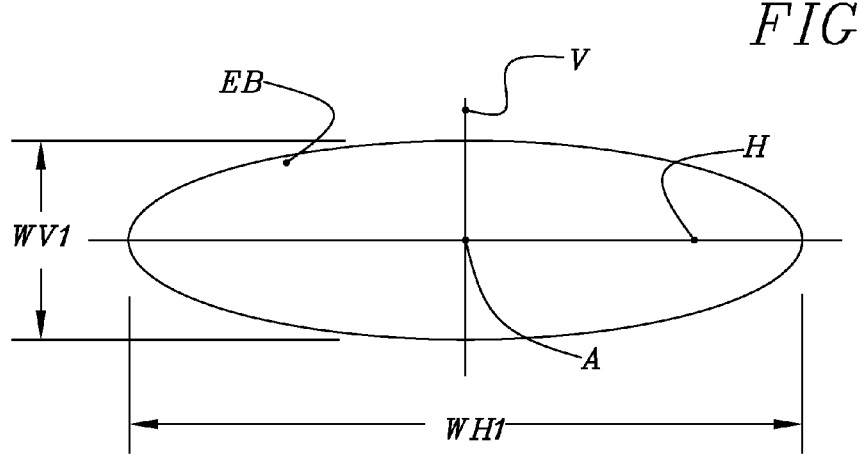
FIG. 12 is a diagram of an optional elongated beam pattern for the rear light of FIG. 11.
Figure 13:
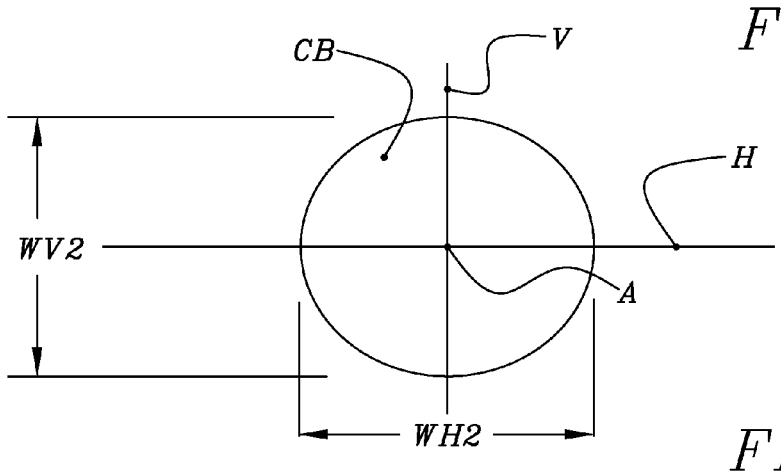
FIG. 13 is a diagram of a second optional concentrated beam pattern for the rear light of FIG. 11.
Figure 14:
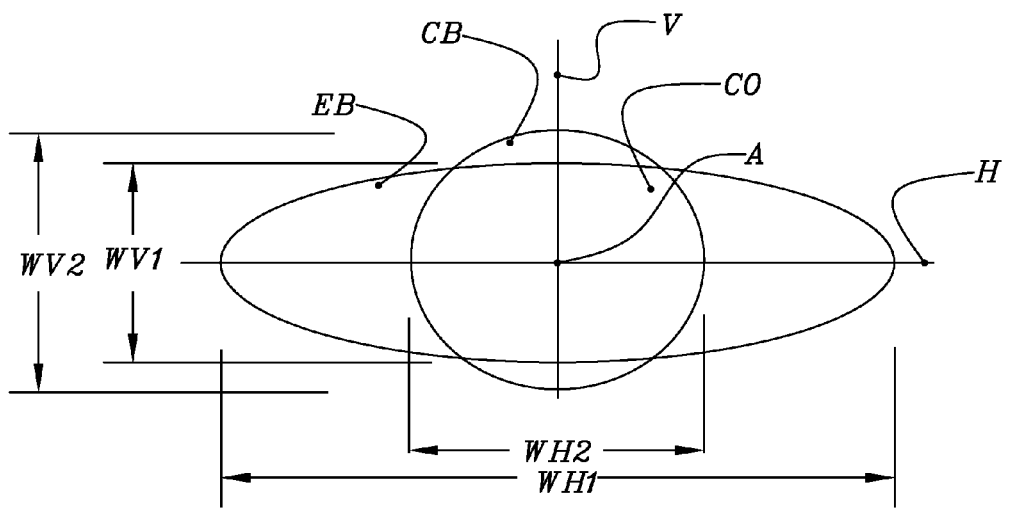
FIG. 14 is a diagram of a third optional beam pattern for the rear light of FIG. 11 which is a combination of the elongated beam pattern of FIG. 12 and the concentrated beam pattern of FIG. 13.

FIG. 8 is an enlarged view of side front light assembly SFA and reflector RS removed from FIG. 7. FIG. 9 is a perspective view of side front light assembly SFA removed from FIG. 8. FIG. 10 is view A of FIG. 7 viewing side front light assembly SFA mounted on vehicle HU from the front of vehicle HU. Looking at FIGS. 7 through 10 it can be seen that reflector side RS is used to secure side front light assembly SFA to vehicle HU using screw top side STS passing through side front bracket top hole 8C and screw bottom side SBS passing through side front bracket bottom hole 8D of side front bracket 9. Reflector side RS is typically identical to reflector rear RR and it is similarly employed to secure the auxiliary vehicle light assembly to vehicle HU. FIG. 9 is a perspective view of side front light assembly SFA which includes light side 3S fastened to side front bracket 9 to provide a warning signal at the front side of the vehicle HU. Side front light assembly SFA is also shown including light front 3F, which is optionally included to provide a warning signal directed forward of vehicle HU. FIG. 10 is a view of light front 3F mounted on the front of vehicle HU. Side front bracket 9 supports both light side 3S and light front 3F on vehicle HU so that their projected light beams, to be later described in FIGS. 12-14, are each directed about horizontal H. Since light side 3S is directed away from the side of vehicle HU and light front 3F is directed away from the front of vehicle HU their emitted light beams diverge at an angle of approximately ninety degrees. Due to the diverging beams and individual elongated beam patterns of both lights the combination of lights provides visibility to vehicles approaching within an angular beamwith exceeding one hundred and eighty degrees.

Figure 11:
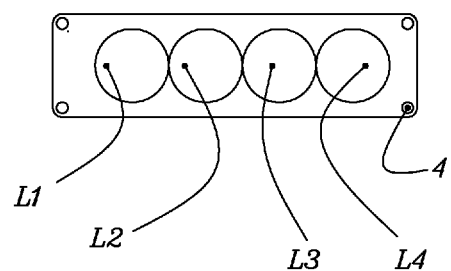
FIG. 11 is a view of the rear light removed from FIG. 4.

FIG. 11 is a front view of light side 3S removed from FIG. 9. Light side 3S includes lens one L1, lens two L2, lens three L3 and lens four L4. Each of the lenses includes their own dedicated optical system and so each can be designed to direct its transmitted light as required.

FIG. 12 identifies elongated light beam EB, a first possible light beam projected from light side 3S of FIG. 11. Elongated light beam EB is exactly directed about reference vertical V and reference horizontal H with an elongated horizontal beamwidth WH1 and exactly directed about reference vertical V and reference horizontal H with an elongated vertical beamwidth WV1. Looking back at FIG. 11 light side 3S, would create elongated light beam EB by designing lenses L1 through L4 each having identical optics with each optic producing an elongated light beam having the contour of elongated light beam EB.

Elongated light beam EB has elongated horizontal beamwidth WH1 which typically exceeds ninety degrees and exceeds six times vertical beamwidth WV1. It finds application for lights mounted on the side of the vehicle so that vehicles approaching from a variety of widely diverging approach angles will all be within elongated light beam EB and all will be alerted by elongated horizontal light beam EB. Clearance lights found on the sides of many trucks also emit light beams having elongated horizontal light beams directed about the horizontal to provide identification throughout a variety of approach angles.

In general and for the present application a light beam has a peak intensity with its contour defined by all directions representing at least ten percent of the peak intensity. The horizontal beamwidth of a light beam is the horizontal angular beamspread and the vertical beamwidth is the vertical angular beamspread of the light beam. If a light beam is directed exactly about a horizontal that means one half of the vertical beamwidth is directed above the horizontal and one half of the vertical beamwidth is directed below the horizontal. If the light beam is directed about the horizontal that means the horizontal is within the vertical beamwidth but not necessarily exactly at the center of the beamwidth. The same principle applies to light beams directed about a vertical. In FIGS. 12-14 the light beams are shown as directed exactly about horizontal H and vertical V because this facilitates the discussion. However, in production the light beams are commonly required to be directed about the horizontal and/or about the vertical.

FIG. 13 identifies concentrated light beam CB, a second possible light beam projected from light side 3S of FIG. 11. Concentrated light beam CB is exactly directed about reference vertical V with concentrated horizontal beamwidth of WH2 and exactly directed about reference horizontal H with concentrated vertical beamwidth of WV2. As can be seen from the diagram concentrated horizontal beamwidth WH2 is approximately equal to concentrated vertical beamwidth WV2. Looking back at FIG. 11 light side 3S, would emit concentrated light beam CB if lenses L1 through L4 each had identical optics with each optic producing a concentrated light beam having the contour of concentrated light beam CB. Concentrated light beam CB has a horizontal beamwidth usually within two times its vertical beamwidth. Concentrated light beam CB is typically more intense than elongated light beam EB because elongated light beam EB has its emerging light energy distributed over a larger beam pattern. The more intense concentrated light beam CB finds application for lights mounted on the front or rear of the vehicle so that oncoming vehicles, which typically approach at a small angle of approach from the front or rear of the vehicle will be alerted by the more powerful concentrated light beam. Elongated light beam EB finds application for those vehicles, vehicle locations or situations in which oncoming vehicles approach from wide angles of divergence from the optical axis of the light beam. In the present embodiment the optical axis of each of lights 3F, 3S and 3R is coincident with its lens axis.

FIG. 14 identifies combined light beam CO a third possible light beam projected from light side 3S of FIG. 11. Looking back at FIG. 11 light side 3S, would create combined light beam CO by designing a first two of lenses L1 through L4 having identical optics with each optic producing an elongated light beam having the contour of elongated light beam EB and designing a second two of lenses L1 through L4 having identical optics with each optic producing a concentrated light beam having the contour of concentrated light beam CB. The combined light beam CO finds application for lights mounted at locations on emergency vehicles which may experience wide angles of approach from a small percentage of oncoming vehicles but which experience a small angle of approach from the great majority of approaching vehicles. These vehicles require lighting that alerts the small quantity of vehicles which approach at wide angles of approach with a light beam of a first intensity and which additionally alerts the large quantity of vehicles which approach at a reduced angle of approach with a second light beam of a second intensity higher than the first intensity. A small angle of approach is equivalent to a small angle of divergence from the lens axis of the light.

Figure 15:
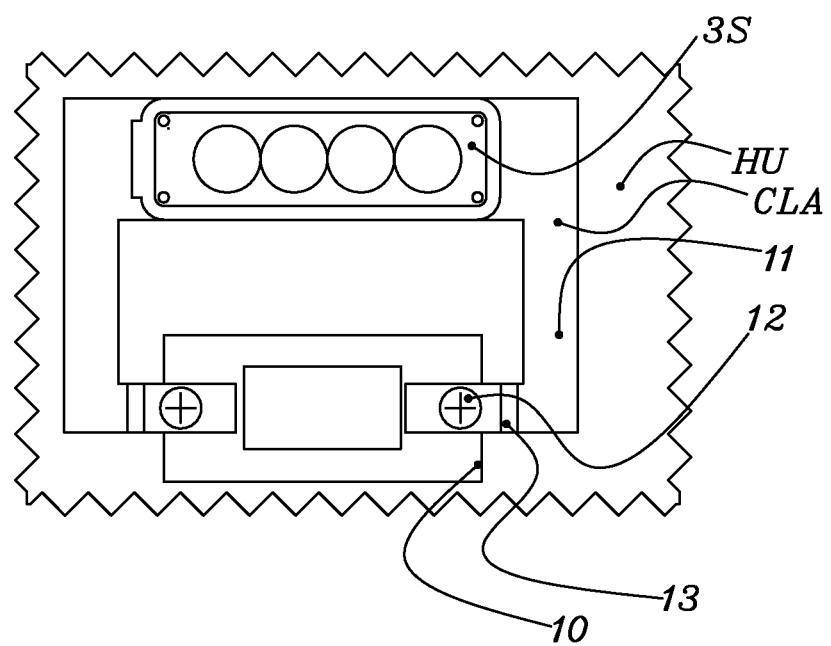
FIG. 15 is a view of a clearance light mounted auxiliary vehicle light.

FIG. 15 is a front view of clearance light assembly CLA attached to a military vehicle clearance light 10 with clearance light screw 12. Clearance light assembly CLA consists of light side 3S attached to clearance light bracket 11. Clearance light bracket 11 includes step 13, which is designed to position light side 3S against vehicle HU even though clearance light 10 projects from the surface of vehicle HU. Clearance light 10 is a typical clearance light found on most military vehicles and constructed according to military standard MS 35423. It includes optics designed to emit an elongated light beam directed about the horizontal and is positioned on the Humvee to insure that after mounting the elongated light beam is directed about the horizontal.

In FIGS. 1 through 15 of the preferred embodiment of the present invention a reflector and a clearance light were employed to attach the lights to the vehicle. The reflector and the clearance light are optical devices or optical components of the vehicle added to the vehicle by the manufacturer of the vehicle. The present invention can employ optical devices such as reflectors, clearance lights, turn signals, marker lights or headlights supplied with the vehicle to attach or mount the auxiliary lighting. The concept of employing optical devices to support the auxiliary lighting within the present application includes employing the optical device, its fasteners, its fastening system or its mounting holes to facilitate attachment of the bracket to the vehicle.

In FIGS. 1-5 and especially FIG. 4 the light and bracket are shown as separate items fastened together. It is noteworthy to realize that rear left bracket 2 need not be a discrete component it could be an integral part or an extension of the light and still employ the concepts which are part of the present application. For example, if the housing of light rear 3R was molded of a transparent resin rear left bracket 2 could be an integral molded extension of the housing eliminating the need for a separate component.

In addition, rear left bracket 2 is L-shaped. This contour permits rear left bracket 2 to be flipped over and used on the opposite side of vehicle HU thereby reducing the number of components necessary to add auxiliary lighting. The L-shaped bracket additionally permits the light to be mounted at a variety of locations on the Humvee and still clear adjacent equipment.

In the present embodiment, including FIGS. 1-15 the lights are attached and secured to the vehicle using brackets contacting optical devices on the vehicle. In use, the lights will be illuminated upon connecting them to the vehicle's power. This is easily achieved by a mechanic using normal low-voltage wires and switches without modifying the vehicle. The illuminated lights will each emit a beam of light having a beam configuration and intensity determined by the optical design of the particular light.

Looking back at FIGS. 8-10 light front 3F can be supplied to emit any of the light beams disclosed in FIG. 12, 13 or 14. However it is typically supplied emitting combined light beam CO as disclosed in FIG. 14 where lenses L1 and L4 each emit elongated light beams similar to elongated light beam EB and lenses L2 and L3 each emit concentrated light beams similar to concentrated light beam CB. Although in this embodiment each light beam is created by two lenses it is possible that a single lens, such as lens L1, could form the elongated light beam and a single lens, such as lens L2, could create the concentrated light beam. Light side 3S typically emits light having elongated light beam EB, as seen in FIG. 12 with lenses L1-L4 each emitting an elongated light beam similar to elongated light beam EB as seen in FIG. 12. Depending upon the needs of a particular vehicle, any of the lights positioned at any location on the vehicle could be supplied with any of the beam patterns indicated in FIGS. 12 through 14.

The preferred embodiment disclosed herein describes auxiliary warning lights required when the military vehicle is engaged as an emergency vehicle. However, the concepts presented could also apply to other types of lights for situations when the military vehicle is engaged in alternate tasks. Other types of auxiliary light include but are not limited to floodlights, headlights, marker and identification lights.

Although the description above contains many specificities, these should not be construed as limiting the scope of the invention but merely providing illustrations of some of the presently preferred embodiments of this invention. Thus, the scope of the invention should be determined by the appended claims and their legal equivalents rather than by the examples given.

I claim:

1. An auxiliary lighting for a vehicle having a reflector, said reflector having two reflector holes in accordance with a military reflector, said vehicle having two vehicle holes and two screws for effecting an attachment of said reflector to said vehicle by employing said two reflector holes, said auxiliary lighting comprising: a bracket: and an auxiliary light securable to the bracket; wherein said bracket with said auxiliary light is configured to be attached to the vehicle by said attachment of said reflector to said vehicle, said auxiliary light being configured to be exterior to said reflector and to emit a first light beam projected in a first direction wherein the bracket is a flat panel, the bracket has a first section elongated in a length direction of the bracket and a second section elongated in a width direction of the bracket, and the first section of the bracket has first and second holes configured to correspond to the two reflector holes of the reflector.

2. An auxiliary lighting according to claim 1, wherein said auxiliary lighting is attachable to an additional vehicle without modification of said auxiliary lighting or said additional vehicle.

3. An auxiliary lighting according to claim 1, wherein the bracket is sandwiched between said reflector and the vehicle when said bracket is attached to the vehicle by said attachment.

4. An auxiliary lighting according to claim 1, wherein said first and second elongated sections of said bracket form an L-shaped, and the bracket is further configured to be attached at one or more locations on the vehicle including a left side of the vehicle and a right side of the vehicle.

5. An auxiliary lighting for a vehicle having a light, said light being attached to said vehicle, said light having two light screws in accordance with a military light, said auxiliary lighting comprising: a bracket: and an auxiliary light securable to the bracket wherein the bracket with said auxiliary light is configured to be attached to the vehicle by said two light screws, said auxiliary light being configured to be exterior to said light and to emit a first light beam projected in a first direction; wherein the bracket is a flat panel the bracket has a first section elongated in a length direction of the bracket and a second section elongated in a width direction of the bracket, and the first section of the bracket has first and second holes configured to receive the two light screws of the light to attach the bracket to the vehicle.

6. An auxiliary lighting according to claim 5, wherein said auxiliary lighting is attachable to an additional vehicle without modification of said auxiliary lighting or said additional vehicle.

7. An auxiliary lighting according to claim 5, wherein the bracket is disposed on a side of the vehicle.

8. An auxiliary lighting according to claim 5, wherein the auxiliary lighting is attachable to the vehicle without permanent modifications to the vehicle or to the auxiliary light.

9. An auxiliary lighting for a vehicle having a reflector, said reflector having two reflector holes in accordance with a military reflector, said vehicle having two vehicle holes and two screws for effecting an attachment of said reflector to said vehicle by employing said two reflector holes, said auxiliary lighting comprising: a bracket; a first auxiliary light securable to the bracket, wherein the bracket with said first auxiliary light is configured to be attached to the vehicle by said attachment of said reflector to said vehicle, the first auxiliary light being exterior to said reflector and configured to emit a first light beam projected in a first direction; a second auxiliary light separate from and exterior to said first auxiliary light, said second auxiliary light being securable to the bracket and configured to emit a second light beam projected in a second direction, wherein said second direction diverges from said first direction by at least sixty degrees; wherein the bracket has a first piece being flat and including (i) a first section elongated in a length direction of the first piece and (ii) a second section elongated in a width direction of the first piece, and a second piece substantially perpendicular to the first piece, the first section of the bracket has first and second holes configured to correspond to the two reflector holes of the reflector, and the first auxiliary light is securable to the first piece of the bracket, and the second auxiliary light is securable to the second piece of the bracket.

10. An auxiliary lighting according to claim 9, wherein said first light beam has an elongated beamwidth directed in a horizontal direction and said second light beam has an elongated beamwidth directed in the horizontal direction and overlapping said first light beam.

11. An auxiliary lighting according to claim 1, wherein the attached auxiliary light is configured to not interfere with adjacent equipment on the vehicle.

12. An auxiliary lighting according to claim 1, wherein the bracket is attached to the vehicle without permanent modifications to the vehicle.

13. An auxiliary lighting according to claim 1, wherein the first section of the bracket includes first and second plurality of adjacent holes, the first plurality of adjacent holes opposing the second plurality of adjacent holes in the length direction of the bracket, and the first plurality of adjacent holes and the second plurality of adjacent holes include said first and second holes, respectively.

14. An auxiliary lighting according to claim 13, wherein the second section of the bracket has screw holes corresponding to screw holes of the auxiliary light for securing the auxiliary light to the bracket by screws.

15. An auxiliary lighting according to claim 14, wherein the auxiliary light extends along the second section of the bracket in the width direction of the bracket.

16. An auxiliary lighting according to claim 5, wherein the first section of the bracket includes first and second plurality of adjacent holes, the first plurality of adjacent holes opposing the second plurality of adjacent holes in the length direction of the bracket, and the first plurality of adjacent holes and the second plurality of adjacent holes include said first and second holes, respectively.

17. An auxiliary lighting according to claim 16, wherein the second section of the bracket has screw holes corresponding to screw holes of the auxiliary light for securing the auxiliary light to the bracket by screws.

18. An auxiliary lighting according to claim 17, wherein the auxiliary light extends along the second section of the bracket in the width direction of the bracket.

19. An auxiliary lighting according to claim 9, wherein the first section of the first piece includes first and second plurality of adjacent holes, the first plurality of adjacent holes opposing the second plurality of adjacent holes in the length direction of the first piece, and the first plurality of adjacent holes and the second plurality of adjacent holes include said first and second holes, respectively.

20. An auxiliary lighting according to claim 19, wherein the second section of the first piece has screw holes corresponding to screw holes of the first auxiliary light for securing the first auxiliary light to the bracket by screws, and the second piece has screw holes corresponding to screw holes of the second auxiliary light for securing the second auxiliary light to the bracket by screws.

21. An auxiliary lighting according to claim 20, wherein the auxiliary light extends along the second section of the bracket in the width direction of the first piece.

* * * * *